(12) United States Patent
Okuno et al.

(10) Patent No.: US 8,022,967 B2
(45) Date of Patent: Sep. 20, 2011

(54) IMAGE PROCESSING METHOD AND IMAGE PROCESSING APPARATUS

(75) Inventors: Yasuhiro Okuno, Tokyo (JP); Toshikazu Ohshima, Kawasaki (JP); Kaname Tanimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 942 days.

(21) Appl. No.: 11/140,996

(22) Filed: Jun. 1, 2005

(65) Prior Publication Data

US 2006/0044327 A1    Mar. 2, 2006

(30) Foreign Application Priority Data

Jun. 3, 2004  (JP) .................................. 2004-166131

(51) Int. Cl.
 *G06G 5/00* (2006.01)
(52) U.S. Cl. ......... 345/633; 345/619; 345/629; 345/632
(58) Field of Classification Search .................. 345/418, 345/619, 629, 632, 633
See application file for complete search history.

(56) References Cited

U.S. PATENT DOCUMENTS

| | | | | |
|---|---|---|---|---|
| 4,200,890 A | * | 4/1980 | Inaba et al. | 348/587 |
| 4,872,056 A | * | 10/1989 | Hicks et al. | 348/584 |
| 5,060,171 A | * | 10/1991 | Steir et al. | 345/630 |
| 5,280,530 A | * | 1/1994 | Trew et al. | 382/103 |
| 5,345,313 A | * | 9/1994 | Blank | 348/598 |
| 5,384,912 A | * | 1/1995 | Ogrinc et al. | 345/501 |
| 5,394,517 A | * | 2/1995 | Kalawsky | 345/632 |
| 5,469,536 A | * | 11/1995 | Blank | 345/594 |
| 5,796,991 A | * | 8/1998 | Shimizu | 703/1 |
| 6,034,739 A | * | 3/2000 | Rohlfing et al. | 348/586 |
| 6,166,744 A | * | 12/2000 | Jaszlics et al. | 345/629 |
| 6,320,580 B1 | * | 11/2001 | Yasui et al. | 345/421 |
| 6,400,374 B2 | * | 6/2002 | Lanier | 345/630 |
| 6,441,815 B1 | * | 8/2002 | McDowall et al. | 345/419 |

(Continued)

FOREIGN PATENT DOCUMENTS

JP          6-030336          2/1919

(Continued)

OTHER PUBLICATIONS

Japanese Office Action dated Aug. 8, 2008 in Japanese Application No. 2004-166131.

(Continued)

*Primary Examiner* — Andrew Wang
*Assistant Examiner* — Abderrahim Merouan
(74) *Attorney, Agent, or Firm* — Fitzpatrick, Cella, Harper & Scinto (57) ABSTRACT

An image processing method includes the steps of acquiring an image of a physical space, acquiring a position and orientation of a viewpoint of the image, generating an image of a virtual object, detecting an area which consists of pixels each having a predetermined pixel value, and superimposing the image of the virtual object on the image of the physical space. The superimposition step includes calculating a distance between a position of the virtual object and a position of the viewpoint, acquiring an instruction indicating whether or not the virtual object is emphasis-displayed, and setting a flag indicating whether or not the image of the virtual object is to be set as a masked target. The masking process image of the virtual object is superimposed or not on the image of the physical space depending if the image of the virtual object is set as the masked target.

3 Claims, 4 Drawing Sheets

U.S. PATENT DOCUMENTS

| | | | |
|---|---|---|---|
| 6,445,815 B1* | 9/2002 | Sato | 382/154 |
| 6,518,939 B1* | 2/2003 | Kikuchi | 345/8 |
| 6,593,925 B1* | 7/2003 | Hakura et al. | 345/426 |
| 6,633,304 B2* | 10/2003 | Anabuki et al. | 345/633 |
| 6,657,637 B1* | 12/2003 | Nishigori et al. | 345/629 |
| 6,680,734 B2* | 1/2004 | Kobayashi | 345/422 |
| 6,822,643 B2 | 11/2004 | Matsui et al. | 345/204 |
| 6,972,734 B1* | 12/2005 | Ohshima et al. | 345/8 |
| 7,376,388 B2* | 5/2008 | Ortiz et al. | 455/3.06 |
| 2002/0057280 A1* | 5/2002 | Anabuki et al. | 345/633 |
| 2002/0075286 A1* | 6/2002 | Yonezawa et al. | 345/679 |
| 2002/0122036 A1* | 9/2002 | Sasaki | 345/422 |
| 2002/0154070 A1* | 10/2002 | Sato et al. | 345/8 |
| 2003/0185461 A1* | 10/2003 | Ohshima | 382/284 |
| 2005/0047672 A1* | 3/2005 | Ben-Ezra et al. | 382/255 |
| 2005/0062742 A1* | 3/2005 | Fery | 345/473 |
| 2005/0068293 A1* | 3/2005 | Satoh et al. | 345/158 |
| 2005/0068316 A1* | 3/2005 | Endo et al. | 345/419 |
| 2005/0104882 A1* | 5/2005 | Kobayashi et al. | 345/421 |
| 2005/0179617 A1* | 8/2005 | Matsui et al. | 345/7 |
| 2005/0234333 A1* | 10/2005 | Takemoto et al. | 600/426 |
| 2005/0288078 A1* | 12/2005 | Cheok et al. | 463/1 |

FOREIGN PATENT DOCUMENTS

| | | |
|---|---|---|
| JP | 08-101924 | 4/1996 |
| JP | 11-331874 | 11/1999 |
| JP | 2002-157606 | 5/2002 |
| JP | 2003-296759 | 10/2003 |

OTHER PUBLICATIONS

N. Yokoya et al, *Stereo Vision Based Video See-through Mixed Reality*, International Symposium on Mixed Reality (1$^{st}$), Yokohama, Nara Institute of Science and Technology, Japan 1999, Chapter 7, pp. 131-145.

* cited by examiner

FIG. 3

IMAGE PROCESSING METHOD AND IMAGE PROCESSING APPARATUS

FIELD OF THE INVENTION

The present invention relates to a technique for superimposing an image of a virtual object on that of a physical space.

BACKGROUND OF THE INVENTION

Conventionally, a mixed reality (MR) presentation apparatus is available. This apparatus superimposes an image of a physical world and that of three-dimensionally modeled CG (computer graphics) data, and allows the user to view as if an object (virtual object) rendered by CG data existed in the physical world.

This is an apparatus which comprises physical image sensing means (e.g., a video camera), CG image generation means for generating a CG image as if it were seen from a position where a physical image is sensed, and image display means (e.g., an HMD (Head Mounted Display) or monitor) that can composite and display both the images.

This apparatus also comprises visual axis position/orientation detection means for detecting the visual axis position and direction of the physical image sensing means (video camera) so as to correctly display the positional relationship between the CG and physical image even when the position and orientation of the visual axis of the physical image sensing means have changed.

The CG image generation means sets three-dimensionally modeled CG data on a virtual space which has the same scale as the physical space, and renders the CG as an object observed from the visual axis position and direction detected by the visual axis position/orientation detection means. When the CG image generated in this way is superimposed on the physical image, an image in which an image generated based on CG data is correctly set on the physical space even when the physical image sensing means observes from any visual axis position and direction can be displayed. Changes of the type and layout, animation, and the like of CG can be freely made in the same manner as general CG data. Another position/orientation sensor may be equipped to designate the position of CG data, so that CG data can be rendered at a location designated by the value of the position/orientation sensor. Conventionally, with this arrangement, the user holds the position/orientation sensor with a hand, and observes CG at the position/orientation of the sensor.

The physical image sensing means that senses an image of the physical space is, e.g., a video camera, and means for sensing an image in the visual axis direction of the camera and capturing it in a memory.

As an image display device that composites an image on the physical space and CG image, for example, an HMD (Head Mounted Display) is used. When the HMD is used in place of a normal monitor, and the video camera is mounted in the visual axis direction of the HMD, an image in a direction in which the observer faces can be displayed on the HMD. In addition, since CG data in that facing direction can also be rendered, the observer can experience a heightened feeling of immersion.

Note that the image display device may be an HMD called an optical see-through type which does not comprise any video camera and allows the user to see through a scene in front of the HMD intact. In this case, the physical image sensing means optically displays a scene in front of the HMD on the display device in place of video image sensing. In the HMD of this type, the scene in front of the observer can be directly seen through without any digital process, and a CG image can be superimposed on that screen.

The image display means in the MR presentation apparatus displays an image obtained by superimposing a physical image and CG image onto the aforementioned image display device.

As the position/orientation detection means, a magnetic position/orientation sensor or the like is used. When such sensor is attached to the video camera (or the HMD to which the video camera is attached), it detects the values of the position and orientation of the visual axis of the video camera. The magnetic position/orientation sensor detects the relative position and orientation between a magnetism source (transmitter) and magnetic sensor (receiver). For example, FASTRAK available from Polhemus Inc. (USA) or the like is known. This device detects the three-dimensional (3D) position (X, Y, Z) and orientation (Roll, Pitch, Yaw) of the sensor in real time within a specific area.

With the above arrangement, the observer can observe a world formed by superimposing physical and CG images via the HMD. When the observer looks around, the physical image sensing device (video camera) attached to the HMD senses a physical image, and the visual axis position/orientation detection means (position/orientation sensor) equipped on the HMD detects the position and orientation of the visual axis direction of the video camera. Based on these data, the CG image generation means generates (renders) a CG image viewed from that visual axis position and orientation to superimpose the CG image on the physical image.

A conventional, general MR presentation method merely superimposes a CG image on a physical image, and does not consider any depth ordering between an object which really exists and a CG object. For this reason, even when the observer puts a hand in front of the CG object, he or she cannot observe his or her hand, and still sees the CG object located behind the hand. FIGS. 2A to 2D are views for explaining such state.

Figure 2A:
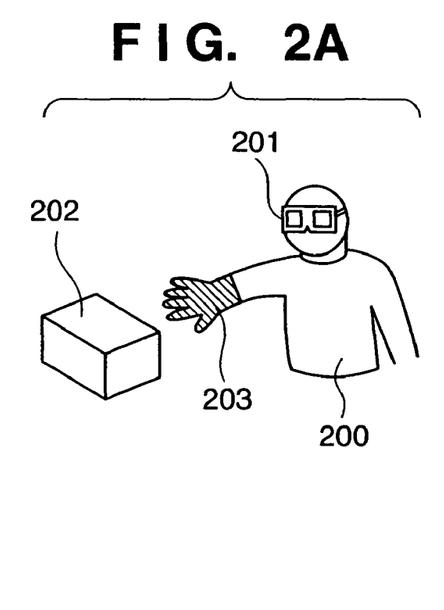
FIG. 2A shows an example of a state wherein an observer 200 who wears an HMD 201 stretches forth a hand 203 to a CG object 202.

FIG. 2A shows an example of a state in which an observer 200 who wears an HMD 201 stretches forth a hand 203 to a CG object 202.

Figure 2B:
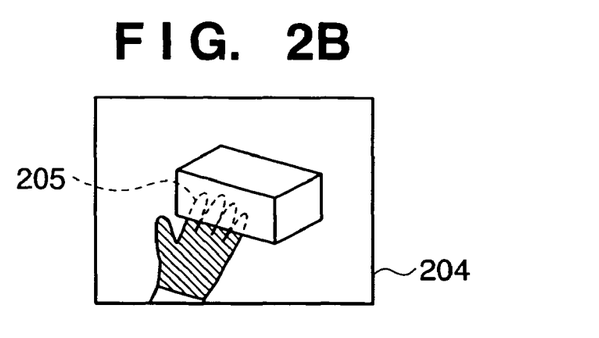
FIG. 2B shows an MR image 204 which is presented by the HMD 201 to the observer 200 in the state shown in FIG. 2A.

An image which is presented by the HMD 201 to the observer 200 in the state shown in FIG. 2A is an MR image 204 shown in FIG. 2B. In FIG. 2B, a fingertip portion 205 which is supposed to be observed is indicated by the broken line for the descriptive convenience. The fingertip portion 205 should be seen in front of the CG object 202 according to the depth ordering between the CG object 202 and hand 203. However, in the prior art, since the image of the CG object 202 is merely superimposed on the physical image, it is undesirably displayed in front of the fingertip image.

In order to solve this problem, conventionally, an overlapping area of physical and CG objects is detected, and the CG object in the detected area is masked to allow the user to see the physical object (e.g., see Japanese Patent Laid-Open No. 2003-296759).

Figure 2C:
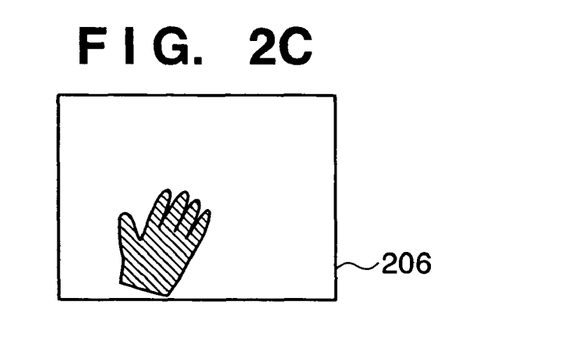
FIG. 2C shows an image used to mask a hand area detected from a physical image.

This technique comprises physical object detection means and CG masking means. For example, in order to correctly display an overlapping state of the hand and CG object, as shown in FIG. 2B, a display area of the hand in the physical image need only be detected. Hence, the physical object detection means can detect an area where the hand is sensed by checking if the color of each pixel of the physical image is approximate to a flesh color. FIG. 2C shows an image used to mask the hand area detected from the physical image.

Figure 2D:
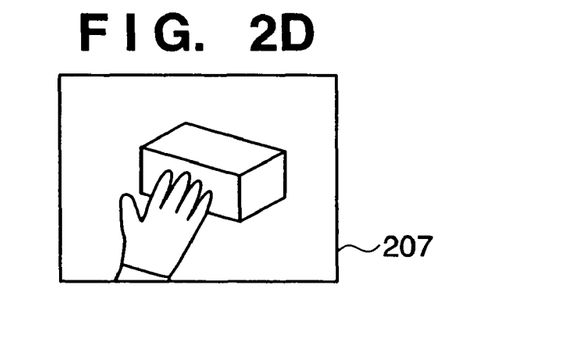
FIG. 2D shows a masked MR image 207.

The CG masking means can prevent the CG object on a corresponding portion by setting an image region where the physical object detection means detects that the hand is sensed in a stencil buffer of the CG object or in a minimum value of a depth buffer (Z-buffer). As a result, an image like a masked MR image 207 can be obtained, as shown in FIG. 2D.

The exemplified method has the following disadvantage: a CG object is not rendered on an area where the flesh color appears in the real image irrespective of its depth. This method is sufficiently effective in a situation where the position of the CG object is always located behind the hand, and is conventionally used. However, when the overlapping state of CG and physical objects must always be expressed correctly, the detection method using a color or the like as in the above example does not suffice as the physical object detection means, and depth information of the physical object viewed from the viewpoint of the observer must be correctly detected.

An MR presentation apparatus which uses a device for detecting depth information of the physical space as the physical object detection means is conventionally used (e.g., see Japanese Patent Laid-Open No. 11-331874). As the CG masking means in this case, means for setting a value obtained by this device in the Z-buffer of the CG object is used.

In the conventional system, a CG masking process is executed for all CG objects on the MR space. However, it is not preferred to apply hand masking to all CG objects depending on systems.

For example, some visual effect that temporarily flickers a CG object or emphasizes its color is given to emphasize and display that object, so as to put the observer on a given CG object displayed on the MR space in some cases. In such case, when a physical object occludes the CG object, the observer's attention cannot be drawn.

Also, when a GUI such as an information display panel which is always seen is to be displayed by CG, it must always be displayed without occlusion irrespective of the positional relationship with a physical object. However, when the physical object occludes the GUI, display disappears.

Hence, since the prior arts apply masking to all CG objects based on the occlusion relationship with a physical object, they cannot flexibly switch the presence/absence of masking processes for respective CG objects upon display according to the types and purposes of display of individual CG objects to be displayed.

SUMMARY OF THE INVENTION

The present invention has been made in consideration of the aforementioned problems, and has as its object to provide a technique that can switch whether or not a portion where a virtual object overlaps a predetermined area in an image on a physical space is to be masked when an image of a virtual object is to be superimposed on an image on the physical space.

In order to achieve an object of the present invention, for example, an image processing method of the present invention comprises the following arrangement.

That is, an image processing method comprises:

a physical image acquisition step of acquiring an image of a physical space;

a viewpoint position/orientation acquisition step of acquiring a position/orientation of a viewpoint;

a virtual image generation step of generating an image of a virtual space according to the position/orientation the viewpoint using virtual object information;

a detection step of detecting a specific object area;

a masking process step of applying a masking process to the image of the virtual space in accordance with the detected object area;

a composition step of compositing the image of the physical space and the image of the virtual space to which the masking process has been applied; and a control step of controlling the masking process in accordance with the masking process control information included in the virtual object information.

In order to achieve an object of the present invention, for example, an image processing method of the present invention comprises the following arrangement.

That is, an image processing method of superimposing an image of a virtual object onto an image of a physical space, comprises:

a setting step of setting for an image of each individual virtual object whether or not a masking portion is to be masked;

a first generation step of generating an image of the virtual object which is set not to be masked in the setting step;

a masking area setting step of setting a masking area; and a second generation step of generating an image obtained by masking the masking portion in the image of the virtual object, which is set to be masked in the setting step, in accordance with the masking area.

In order to achieve an object of the present invention, for example, an image processing apparatus of the present invention comprises the following arrangement.

That is, an image processing apparatus comprises:

physical image acquisition unit adapted to acquire an image of a physical space;

viewpoint position/orientation acquisition unit adapted to acquire a position/orientation of a viewpoint;

virtual image generation unit adapted to generate an image of a virtual space according to the position/orientation of the viewpoint using virtual object information;

detection unit adapted to detect a specific object area;

masking process unit adapted to apply a masking process to the image of the virtual space in accordance with the detected object area;

composition unit adapted to composite the image of the physical space and the image of the virtual space to which the masking process has been applied; and control unit adapted to control the masking process in accordance with the masking process control information included in the virtual object information.

In order to achieve an object of the present invention, for example, an image processing apparatus of the present invention comprises the following arrangement.

That is, an image processing apparatus for superimposing an image of a virtual object onto an image of a physical space, comprises:

setting unit adapted to set for an image of each individual virtual object whether or not a masking portion is to be masked;

first generation unit adapted to generate an image of the virtual object which is set not to be masked by the setting unit;

masking area setting unit adapted to set a masking area; and second generation unit adapted to generate an image obtained by masking the masking portion in the image of the virtual object, which is set to be masked by the setting unit, in accordance with the masking area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

A mixed reality (MR) presentation system according to this embodiment to be described below is used to present a known mixed reality space (to be referred to as an MR space hereinafter) generated by combining physical and virtual spaces to the observer. Note that upon presenting an image generated by combining the physical and virtual spaces to the observer, the system according to this embodiment basically renders an image of the physical space and that of the virtual space in turn; and masks the area of a virtual object that overlaps a physical object as in the prior art. However, in this embodiment, whether or not masking is applied can be set for each virtual object unlike in the prior art. The MR presentation system according to this embodiment will be described below.

Figure 1:
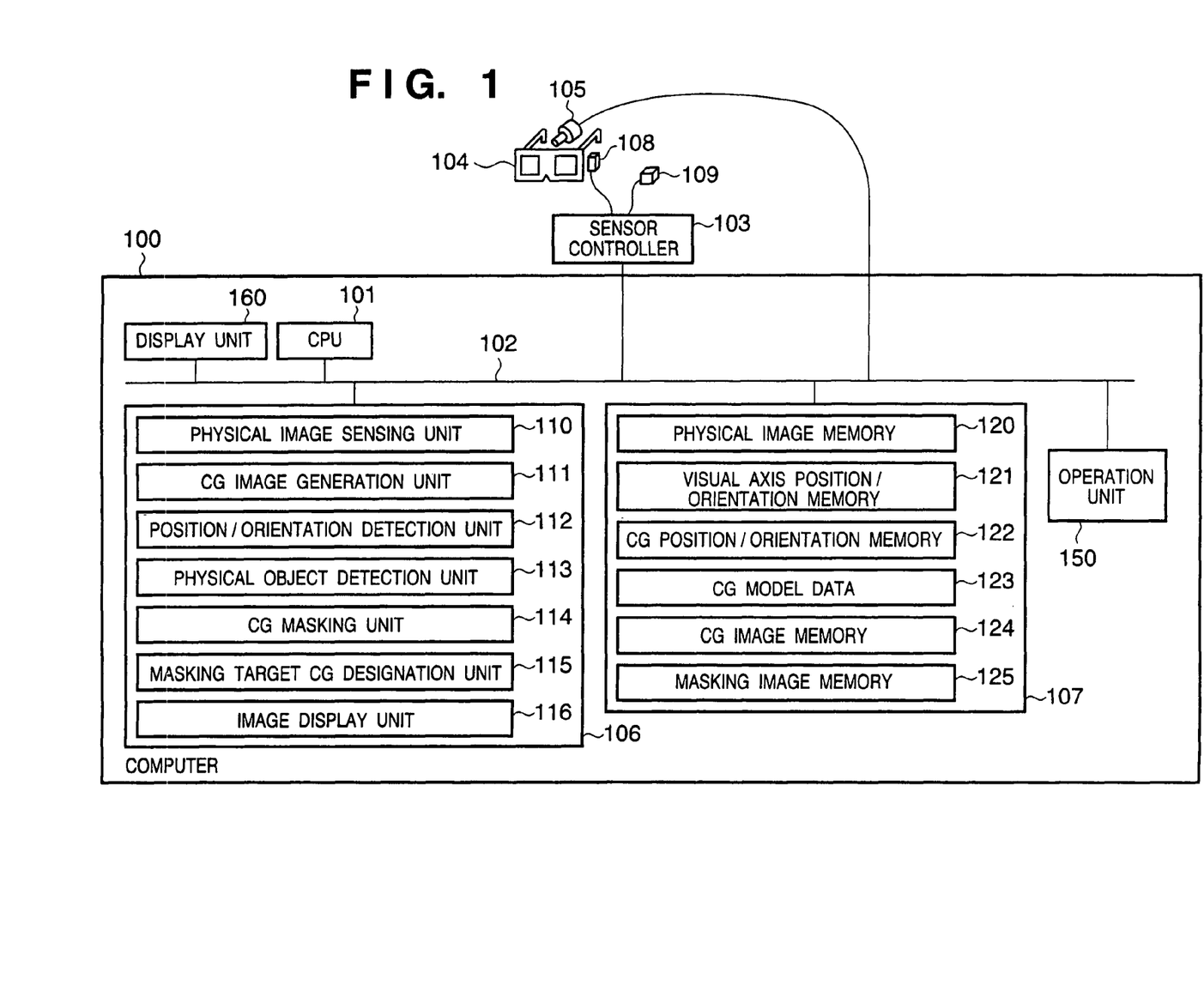
FIG. 1 is a block diagram showing the basic arrangement of an MR presentation system according to the first embodiment of the present invention.

FIG. 1 is a block diagram showing the basic arrangement of the MR presentation system according to this embodiment.

This system roughly comprises a computer 100, HMD (Head Mounted Display) 104, video camera 105, position/orientation sensors 108 and 109, and sensor controller 103. These components will be described in detail below.

The HMD 104 will be explained first.

As is well known, the HMD 104 is worn on the head of the observer who experiences the MR space, so that display units (not shown) of the HMD 104 are located in front of the eyes of the observer.

The video camera 105 is fixed to the HMD 104 so as to sense an image in the visual axis direction of the observer when the observer wears the HMD 104 on the head. Hence, the video camera 105 can sense an image of the physical space that can be seen according to the position and orientation of the HMD 104.

The position/orientation sensor 108 is fixed to the HMD 104. The position/orientation sensor 108 comprises a magnetic sensor, ultrasonic sensor, or the like. The sensor 108 measures the position and orientation of itself, and outputs the measurement result as a signal to the sensor controller 103. In the description of this embodiment, the position/orientation sensor 108 measures the position and orientation of itself on the world coordinate system (a space which has one point on the physical space as an origin, and defines three axes that intersect each other at this origin as x-, y-, and z-axes). The measurement result of the position/orientation sensor 108 is output as a signal to the sensor controller 103, which outputs a numerical value according to the strength of the received signal to the computer 100.

The position/orientation sensor 109 is held by a hand of the observer who experiences the MR space and is used to change the position and orientation of a virtual object on the MR space. The sensor 109 is the same as the position/orientation sensor 108. More specifically, the position/orientation sensor 109 measures the position and orientation of itself on the world coordinate system, and outputs the measurement result as a signal to the sensor controller 103. The sensor controller 103 similarly outputs the measurement result as numerical value data to the computer 100 according to the strength of the received signal.

The computer 100 will be explained below.

The computer 100 normally comprises a PC (personal computer), WS (workstation), or the like. The computer 100 may comprise dedicated hardware. The computer 100 comprises a CPU 101, memories 106 and 107, operation unit 150, and display 160, which are connected to each other via a bus 102.

The CPU 101 executes processes to be described later using various programs stored in the memory 106 and various data stored in the memory 106, and also controls the overall computer 100. In addition, the CPU 101 controls data communications with the sensor controller 103, as will be described later.

The memory 106 stores various programs (a physical image sensing unit 110, CG image generation unit 111, position/orientation detection unit 112, physical object detection unit 113, CG masking unit 114, masking target CG designation unit 115, and image display unit 116), which make the CPU 101 implement various processes to be described later. These programs will be described later. Although not shown, the memory 106 stores various programs required to control the overall computer 100.

The memory 107 comprises various work areas required for the CPU 101 to execute respective processes to be described later, areas that store various data used by the CPU 101 upon executing respective processes to be described later, and the like. Although not shown, the memory 107 stores various programs required to control the overall computer 100.

Note that the memories 106 and 107 are described as independent ones in this embodiment. However, the present invention is not limited to this, and these memories may be assured on a single memory.

The operation unit 150 comprises a keyboard, mouse, and the like, and can input various instructions to the CPU 101.

The display unit 160 comprises a CRT, liquid crystal display, or the like, and can display various kinds of information by means of images, text, and the like.

Note that the arrangement of the computer 100 is not limited to such specific arrangement. For example, the computer 100 may further comprise a hard disk drive device used to save various programs and data stored in the memories 106 and 107, a network I/F unit used to externally output the processing result of the computer 100 via the network, and the like.

Figure 3:
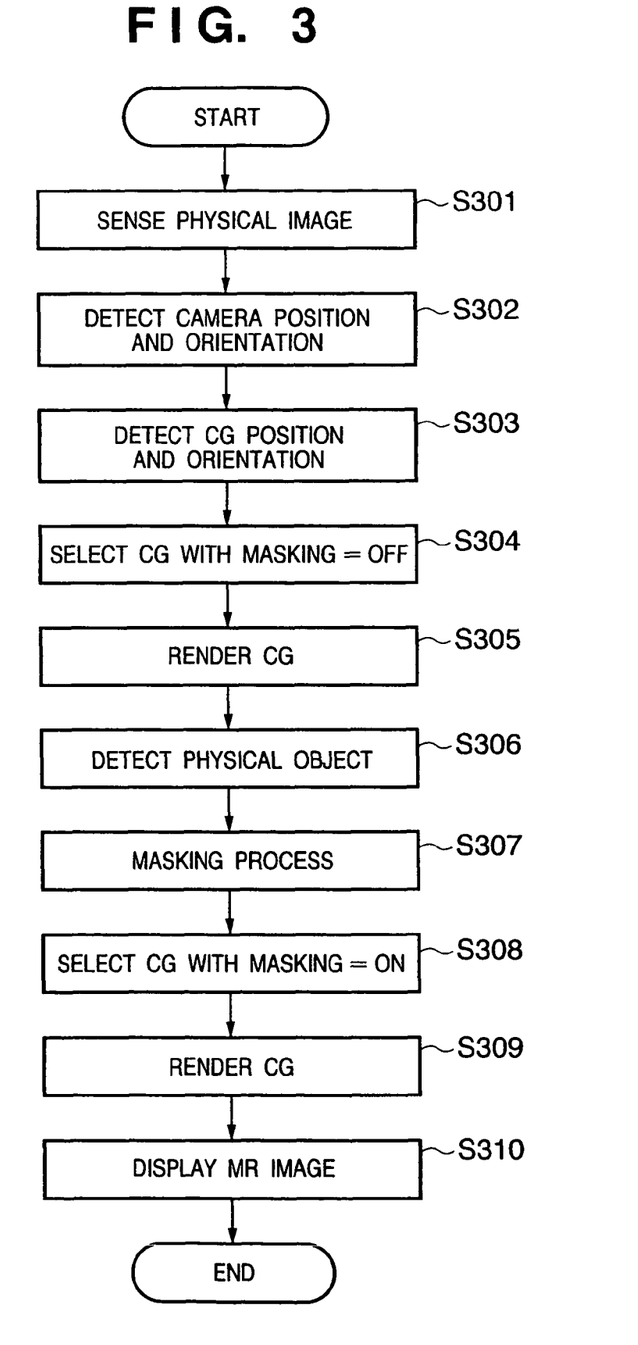
FIG. 3 is a flowchart showing the processing which is implemented by executing programs stored in a memory 106 by a CPU 101, and generates and presents an MR image to the observer.

FIG. 3 is a flowchart showing the processing which is implemented by executing programs stored in the memory 106 by the CPU 101, and generates and presents an MR image to the observer.

The video camera 105 senses a moving image of the physical space which can be seen according to the position and orientation of the HMD 104, and frame images (physical space images) which form this moving image are sequentially input to the computer 100. Therefore, in step S301, a process for capturing the physical space images input from the video camera 105 to the computer 100 and storing them in a physical image memory 120 is implemented by executing the program of the physical image sensing unit 110.

In step S302 that aims at obtaining the position and orientation of the video camera 105 on the world coordinate system, the program of the position/orientation detection unit 112 is executed to implement a process for storing, in a visual axis position/orientation memory 121, the result which is measured by the position/orientation sensor 108 and is converted into numerical value data by the sensor controller 103. Then, using the position/orientation relationship between the video camera 105 and position/orientation sensor 108, the position and orientation of the video camera 105 on the world coordinate system are obtained from the result measured by the position/orientation sensor 108 by a known conversion process. Assume that the position/orientation relationship between the video camera 105 and position/orientation sensor 108 is measured in advance and is stored in a predetermined area in the memory 107 as data.

With the above process, since the position/orientation data of the video camera 105 on the world coordinate system can be obtained, the obtained result data is stored in the visual axis position/orientation memory 121.

In step S303, the result which is measured by the position/orientation sensor 109 and is converted into numerical value data by the sensor controller 103 is stored in a CG position/orientation memory 122. The data stored in the CG position/orientation memory 122 indicates the position and orientation of the position/orientation sensor 109 itself on the world coordinate system, as described above.

In step S304, the program of the masking target CG designation unit 115 is executed to select data of a virtual object which is not to be masked with reference to CG model data as data required to render a virtual object which forms the virtual space. This CG model data 123 is prepared for each virtual object.

Details of the process in step S304 will be explained below.

Figure 4:
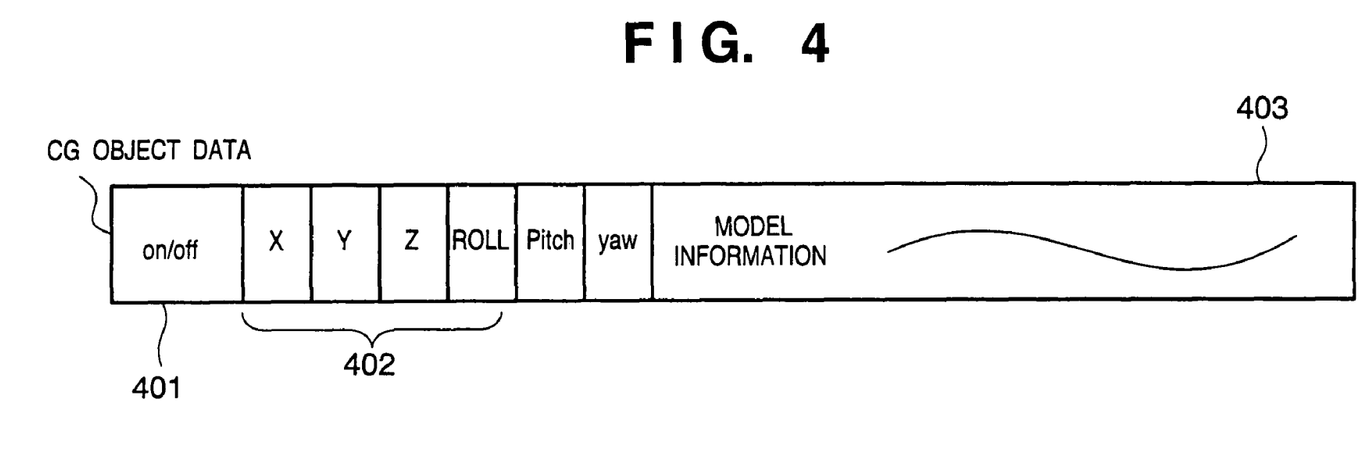
FIG. 4 shows an example of the configuration of CG model data for one virtual object.

FIG. 4 shows an example of the configuration of CG model data corresponding to one virtual object. Data of a virtual object (CG object data) to be rendered in this embodiment includes a masking target flag 401 indicating whether or not this virtual object is a masking target in addition to position/orientation information 402 indicating the position and orientation (position (x, y, z) and orientation (roll, pitch, yaw)) of the virtual object and model information 403 as visual information such as a color, shape, and the like of the virtual object which are also included in the conventional CG model data.

This masking target flag 401 can be expressed by 1 bit that indicates ON/OFF. For example, if the value of the masking target flag 401 is "1" (ON), it indicates that the virtual object is "a masking target"; if it is "0" (OFF), it indicates that the virtual object is "not a masking target".

For example, when a virtual object is to be emphasis-displayed, if the masking target flag of that virtual object is set OFF only for the time required for emphasis display, no masking process is applied to that virtual object. When an image generated by rendering an image of the physical space and that of the virtual space is to be presented on the display units of the HMD 104, this virtual object is displayed without being occluded by a physical object irrespective of the positional relationship between this virtual object and physical object. Therefore, this virtual object can be displayed to attract the observer's attention. When the value of the masking target flag 401 is to be changed dynamically in this way, the program of the masking target CG designation unit 115 is executed to check if the current time corresponds to the emphasis display time. If it is determined that the current time corresponds to the emphasis display time, the masking target flag 401 in CG model data of the virtual object to be displayed is set OFF.

Also, for a control panel (a virtual object as a GUI) which is always required to be presented to the observer, the masking target flag may be maintained to be OFF all the time. In this manner, when a virtual object which is not to be masked is determined in advance, the masking target flag 401 of CG model data of such virtual object is set in advance using the operation unit 150 by the operator of the computer 100. In such case, an actual flag value setting process is implemented by executing the program of the masking target CG designation unit 115.

When a virtual object is to be laid out at the position of the position/orientation sensor 109, if the observer observes that object while holding the position/orientation sensor 109 by a hand, his or her hand may often occlude that virtual object. As far as the positional relationship is concerned, it may be correct that the hand occludes the virtual object, but the observer may want to observe the whole virtual object. In such case, the masking target flag of the virtual object to be displayed at the position of the position/orientation sensor 109 may be set OFF. In this manner, when the observer wants to observe the whole virtual object to be laid out at the position of the position/orientation sensor 109, the masking target flag 401 of CG model data of that virtual object is set in advance using the operation unit 150 by the operator of the computer 100. In such case as well, an actual flag value setting process is implemented by executing the program of the masking target CG designation unit 115.

Furthermore, when a virtual object is to be displayed in the vicinity of the video camera 105, since there is no probability that any physical object enters between the video camera 105 and virtual object, the masking target flag may be set OFF for such virtual object. In this case, the program of the masking target CG designation unit 115 is executed to calculate the distance between the video camera 105 and virtual object using the position of the virtual object to be displayed on the world coordinate system (which can be acquired based on the position/orientation information 402) and that of the video camera 105 on the world coordinate system (which can be acquired in step S302). When the calculated distance becomes equal to or smaller than a predetermined value, the masking target flag 401 in CG model data of the virtual object to be displayed is set OFF.

In this manner, ON/OFF of the masking target flag 401 of a virtual object which is not to be masked can be switched and set by executing the program of the masking target CG designation unit 115 in various situations.

Therefore, in step S304 only CG model data whose masking target flag 401 is OFF is selected as an object to be rendered with reference to the value of the masking target flag 401 in CG model data of each virtual object. In step S305, the program of the CG image generation unit 111 is executed to generate (render) an image of the virtual object to rendered in accordance with the model information 403 on CG model data. Upon this rendering, an image of the virtual object seen from the video camera 105 is generated using the data stored in the visual axis position/orientation memory 121 in step S302 and the position/orientation information 402 in the CG model data.

When a virtual object whose position and orientation change dynamically (for example, a virtual object which is laid out at the position of the position/orientation sensor 109) is to be rendered, the position/orientation information 402 of this virtual object is updated as needed prior to the aforementioned rendering process. Then, an image of the virtual object seen from the video camera 105 is generated using the updated position/orientation information 402 and the data stored in the visual axis position/orientation memory 121 in step S302.

Note that the rendering technique of a virtual object image that can be seen from a predetermined viewpoint position and orientation is known to those who are skilled in the art, and a description thereof will be omitted.

In step S306, the program of the physical object detection unit 113 is executed to implement a process for detecting an area occupied by a specific object in an image stored in the physical image memory 120. For example, when an area occupied by a hand in the physical space image is to be detected, such process is implemented by detecting a pixel group having pixel values indicating a flesh color (a flesh color which is assumed as a color of a "hand" in advance) in this image. An image formed by the detected pixel group (an image in the hand area in the physical space image) is stored in a masking image memory 125.

In step S307, the program of the CG masking unit 114 is executed to mask the image area detected in step S306. More specifically, an image of the virtual object is prevented from being rendered on the image area detected in step S306 using a stencil buffer or Z-buffer as in the conventional method.

Note that the contents of the process implemented by executing the program of the physical object detection unit 113 in step S306 and the process implemented by executing the program of the CG masking unit 114 in step S307 are not limited to such specific contents. Other processes can be applied as long as the same object can be achieved.

For example, when a depth camera which can detect depth information of the physical space is applied as the video camera 105, the program of the physical object detection unit 113 is executed to record this depth information in the masking image memory 125, and the program of the CG masking unit 114 is executed to set the depth information obtained from the depth camera in the Z-buffer.

In step S308, CG model data of a virtual object whose masking target flag 401 is ON is read out as an object to be rendered. In step S309, the program of the CG image generation unit 111 is executed to generate (render) an image of the virtual object as the object to be rendered on a CG image memory 124 by overwrite in accordance with the model information 403 in the CG model data read out in step S308. This rendering process is basically the same as that in step S305 except for the following process.

That is, nothing is rendered on the image area (an area which overlaps the image area detected in step S306 when the virtual image is superimposed on the physical space image) masked in step S307 in the image to be rendered.

In step S310, the program of the image display unit 116 is executed to superimpose the image rendered on the CG image memory 124 in step S309 (an image generated by compositing the image of the virtual object whose masking target flag 401 is ON and that of the virtual object whose masking target flag 401 is OFF) on the image (physical space image) recorded on the physical image memory 120. In this way, the images of both the virtual objects whose masking target flags 401 are ON and OFF are rendered on a non-masking portion in the physical space image, and the image of the virtual object whose masking target flag 401 is ON is not rendered on the masked portion but the image whose masking target flag 401 is OFF can be rendered.

In this manner, whether or not a virtual object is to be masked can be individually set for respective virtual objects, and an MR image according to this setting can be generated. The generated MR image is output to and displayed on the display unit 160 and those of the HMD 104.

When the aforementioned processing is applied to respective frames input from the video camera 105, an image on the MR space that can be seen from the video camera 105 can be presented to the observer.

As described above, according to this embodiment, whether or not a virtual object is to be masked can be individually set for respective virtual objects, so that an MR image can be flexibly generated in accordance with the situation on the MR space.

Second Embodiment

In the description of the first embodiment, the position/orientation sensor 108 (109) measures the position and orientation of itself on the world coordinate system. However, the present invention is not limited to this. For example, when the position/orientation sensor 108 (109) measures the position and orientation on a predetermined coordinate system, if the computer 100 holds data indicating the position/orientation relationship between this predetermined coordinate system and world coordinate system, the result measured by the position/orientation sensor 108 (109) can be converted into a position and orientation on the world coordinate system by a known calculation method using this data. Hence, even when the position/orientation sensor 108 (109) measures a position and orientation on any coordinate system, the computer 100 can calculate the world coordinate system of the position/orientation sensor 108 (109). Therefore, the position/orientation sensor 108 (109) need not always measure a position and orientation on the world coordinate system.

Third Embodiment

In the above embodiment, ON/OFF of each masking target flag 401 is switched by the operator or the CPU 101 automatically. Alternatively, ON/OFF of each masking target flag 401 may be switched according to the intention of the observer.

For example, since the observer holds the position/orientation sensor 109 by a hand, he or she moves the position/orientation sensor 109 toward a virtual object to be observed without being occluded by another object (physical object, virtual object), thereby turning off the masking target flag 401 of that virtual object. In this case, the CPU 101 refers to the "position of the position/orientation sensor 109 on the world coordinate system" and the "position of the virtual object on the world coordinate system" obtained from the sensor controller 103. When the virtual object exists at a position where the distance to the position/orientation sensor 109 is equal to or smaller than a predetermined value, the CPU 101 turns off the masking target flag 401 of this virtual object. In this way, the observer can observe this object without being masked and occluded by anything.

When the distance between this virtual object and the position/orientation sensor 109 becomes equal to or larger than the predetermined value, the CPU 101 turns on the masking target flag 401 of this virtual object.

In this manner, the observer can arbitrarily select a virtual object to be observed without being occluded by another object (physical object, virtual object). Note that the selection method is not particularly limited as long as the same object can be achieved using an arbitrary interface or arbitrary method.

Conversely, a virtual object whose masking target flag 401 is to be turned on may be selected. In this case, the position/orientation sensor 109 may be moved toward that virtual object as in the above process, or other methods may be used as described above.

Other Embodiments

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores a program code corresponding to the aforementioned flowchart.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-166131 filed on Jun. 3, 2004, which is hereby incorporated by reference herein.

The invention claimed is:

1. An image processing method comprising: a physical image acquisition step of acquiring an image of a physical space;
a viewpoint position and orientation acquisition step of acquiring a position and orientation of a viewpoint of the image of the physical space;
a generation step of generating an image of a virtual object, based on the acquired position and orientation;
a detection step of detecting, as an object area, an area which consists of pixels each having a predetermined pixel value, from the image of the physical space; and
a superimposition step of superimposing the image of the virtual object on the image of the physical space,
wherein the superimposition step includes:
a calculation step of calculating a distance between a position of the virtual object and a position of the viewpoint;
an acquisition step of acquiring, from an operation panel operated by an operator, an operator instruction indicating whether or not the virtual object is to be emphasis-displayed;
a setting step of changing a flag to indicate that the image of the virtual object is to be set as a masked target when both: a) the operator instruction indicates that the virtual object is not to be emphasis-displayed, b) the calculated distance is not smaller than a predetermined distance, and changing the flag to indicate that the image of the virtual object is not to be set as a masked target when both: a) the operator instruction indicates that the virtual object is to be emphasis-displayed, b) the calculated distance is smaller than the predetermined distance;
a step of, while the flag is set to indicate that the image of the virtual object is to be set as the masked target, applying a masking process to a portion of the image of the virtual object which overlaps with the object area, and superimposing the masking processed image of the virtual object on the image of the physical space; and
a step of, while the flag is set to indicate that the image of the virtual object is not to be set as the masked target, without applying a masking process to the portion of the image of the virtual object, superimposing the image of the virtual object on the image of the physical space.

2. A computer-readable storage medium encoded with a computer program to implement an image processing method comprising:
a physical image acquisition step of acquiring an image of a physical space;
a viewpoint position and orientation acquisition step of acquiring a position and orientation of a viewpoint of the image of the physical space;
a generation step of generating an image of a virtual object, based on the acquired position and orientation;
a detection step of detecting, as an object area, an area which consists of pixels each having a predetermined pixel value, from the image of the physical space; and
a superimposition step of superimposing the image of the virtual object on the image of the physical space,
wherein the superimposition step includes:
a calculation step of calculating a distance between a position of the virtual object and a position of the viewpoint;
an acquisition step of acquiring, from an operation panel operated by an operator, an operator instruction indicating whether or not the virtual object is to be emphasis-displayed;
a setting step of changing a flag to indicate that the image of the virtual object is to be set as a masked target when both: a) the operator instruction indicates that the virtual object is not to be emphasis-displayed and, b) the calculated distance is not smaller than a predetermined distance, and changing the flag to indicate that the image of the virtual object is not to be set as a masked target when both: a) the operator instruction indicates that the virtual object is to be emphasis-displayed, b) the calculated distance is smaller than the predetermined distance;
a step of, while the flag is set to indicate that the image of the virtual object is to be set as the masked target, applying a masking process to a portion of the image of the virtual object which overlaps with the object area, and superimposing the masking processed image of the virtual object on the image of the physical space; and
a step of, while the flag is set to indicate that the image of the virtual object is not to be set as the masked target, without applying a masking process to the portion of the image of the virtual object, superimposing the image of the virtual object on the image of the physical space.

3. An image processing apparatus comprising: a physical image acquisition unit adapted to acquire an image of a physical space;

a viewpoint position and orientation acquisition unit adapted to acquire a position and orientation of a viewpoint of the image of the physical space;

a generation unit adapted to generate an image of a virtual object, based on the acquired position and orientation;

a detection unit adapted to detect, as an object area, an area which consists of pixels each having a predetermined pixel value, from the image of the physical space; and a superimposition unit adapted to superimpose the image of the virtual object on the image of the physical space, wherein the superimposition unit includes:

a calculation unit adapted to calculate a distance between a position of the virtual object and a position of the viewpoint;

an acquisition unit adapted to acquire, from an operation panel operated by an operator, an operator instruction indicating whether or not the virtual object is to be emphasis-displayed;

a setting unit adapted to (1) a flag to indicate that the image of the virtual object is to be set as a masked target when both: a) the operator instruction indicates that the virtual object is not to be emphasis-displayed, b) the calculated distance is not smaller than a predetermined distance, and changing the flag to indicate that the image of the virtual object is not to be set as a masked target when both: a) the operator instruction indicates that the virtual object is to be emphasis-displayed, b) the calculated distance is smaller than the predetermined distance, (2) while the flag is set to indicate that the image of the virtual object is to be set as the masked target, apply a masking process to a portion of the image of the virtual object which overlaps with the object area, and superimpose the masking processed image of the virtual object on the image of the physical space, and (3) while the flag is set to indicate that the image of the virtual object is not to be set as the masked target, without applying a masking process to the portion of the image of the virtual object, superimpose the image of the virtual object on the image of the physical space.

* * * * *